United States Patent
Dolan et al.

(10) Patent No.: US 9,729,516 B2
(45) Date of Patent: Aug. 8, 2017

(54) METHOD OF MACHINE-TO-MACHINE COMMUNICATION

(75) Inventors: Michael Dolan, Bolingbrook, IL (US); Satish Kanugovi, Karnataka (IN); Michael Lemke, Plainfield, IL (US); Sidney Bryson, Bolingbrook, IL (US)

(73) Assignee: Gemalto Sa, Meudon (FR)

( * ) Notice: Subject to any disclaimer, the term of this patent is extended or adjusted under 35 U.S.C. 154(b) by 811 days.

(21) Appl. No.: 12/662,296

(22) Filed: Apr. 9, 2010

(65) Prior Publication Data
US 2011/0252235 A1 Oct. 13, 2011

(51) Int. Cl.
*H04L 29/06* (2006.01)
*H04W 4/00* (2009.01)
*H04W 88/04* (2009.01)
*H04L 29/12* (2006.01)
*H04W 4/08* (2009.01)

(52) U.S. Cl.
CPC .... *H04L 63/0428* (2013.01); *H04L 29/12801* (2013.01); *H04L 61/6004* (2013.01); *H04W 4/00* (2013.01); *H04W 4/005* (2013.01); *H04W 88/04* (2013.01); *H04L 29/12254* (2013.01); *H04L 29/12292* (2013.01); *H04L 61/2038* (2013.01); *H04L 61/2069* (2013.01); *H04W 4/08* (2013.01)

(58) Field of Classification Search
CPC ............................ G06F 21/32; G07C 9/00087
USPC ........................................................ 713/168
See application file for complete search history.

(56) References Cited

U.S. PATENT DOCUMENTS

| | | | |
|---|---|---|---|
| 6,862,284 B1 | 3/2005 | Spiegel et al. | |
| 7,693,040 B1* | 4/2010 | Bhugra et al. | 370/208 |
| 2005/0149758 A1* | 7/2005 | Park | H04L 9/3236 |
| | | | 726/4 |
| 2007/0150720 A1* | 6/2007 | Oh | H04L 63/065 |
| | | | 713/153 |

(Continued)

FOREIGN PATENT DOCUMENTS

WO   WO 2005/094193   10/2005
WO   WO-2009149759 A1   12/2009

OTHER PUBLICATIONS

Lee et al., "A New Control Protocol for Home Appliaces—LnCP" IEEE, 2001, pp. 286-291.*

(Continued)

*Primary Examiner* — Benjamin Lanier
(74) *Attorney, Agent, or Firm* — Harness, Dickey & Pierce, P.L.C.

(57) ABSTRACT

In one embodiment, the method includes encrypting, at a device, data with a first key, and forming a message that includes a device identifier and the encrypted data. The device identifier identifies the device. A signaling message is formed that includes a class identifier, the message and an action code. The class identifier identifies a group of devices to which one or more devices belong. The action code indicates the type of data, and may be part of the message. The signaling message is sent to a network, for example, a wireless network. The wireless network identifies and routes the message portion of the signaling message based on the class identifier. And, using the class identifier and perhaps a device identifier, the wireless network may signal the device to change an operating parameter.

7 Claims, 5 Drawing Sheets

(56) References Cited

U.S. PATENT DOCUMENTS

| | | | |
|---|---|---|---|
| 2008/0139203 A1* | 6/2008 | Ng | H04W 12/06 455/436 |
| 2008/0186202 A1 | 8/2008 | Vaswani et al. | |
| 2010/0087186 A1* | 4/2010 | Gupta et al. | 455/424 |
| 2010/0142538 A1* | 6/2010 | Glover | H04L 67/327 370/400 |
| 2012/0030358 A1* | 2/2012 | MacKenzie | H04W 52/0216 709/226 |

OTHER PUBLICATIONS

Lee et al. "A New Control Protocol for Home Appliances—LnCP" IEEE, 2001, pp. 286-291.*

3GPP TS 22.368, 3$^{rd}$ Generation Partnership Project; Technical Specification Group Services and System Aspects; Service requirements for machine-type communications; Stage 1 (Release 10), V2.0.0 (Mar. 2010).

Koon-Seok Lee et al., "A New Control Protocol for Home Appliances—LnCP," Industrial Electronics, 2001. Proceedings. ISIE 2001. IEEE International Symposium on Jun. 12-16, 201, Piscataway, NJ, USA, vol. 1, pp. 286-291, XP010549024.

Kwan Joo Myoung et al., "Home Network Control Protocol for Networked Home Appliances," IEEE Transactions on Consumer Electronics IEEE USA, vol. 52, No. 3, Aug. 2006, pp. 802-810, XP002644208.

Zhan Jun et al., "Address Allocation Scheme of Wireless Sensor Networks based on IPv6," Broadband Network & Multimedia Technology, 2009. 2$^{nd}$ IEEE International Conference On, IEEE, Piscataway, NJ, USA, Oct. 18, 2009, pp. 597-601, XP031576260.

Mike Dolan, "Numbering in 3GPP2 for M2M," M2M-20100412_Teleconference, Apr. 12, 2010, Retrieved from the Internet: URL: ftp://ftp.3gpp2.org/SC_OP/Working/M2M_Adhoc/2010/M2M-20100412_Teleconference/M2M-20100412-005_ALU%20-%20M2M%20Communications%20in%203GPP2%20-%20April%2012-2010.ppt [retrieved Jun. 21, 2011].

Partial International Search Report dated Jul. 12, 2011.

John Newbury et al., "Multiprotocol Routing for Automatic Remote Meter Reading Using Power Line Carrier Systems," IEEE Transactions on Power Delivery, IEEE Service Center, New York, NY, US, vol. 16, No. 1, Jan. 1, 2001, XP011050019.

International Search Report and Written Opinion dated Oct. 11, 2011.

Notice of Reason for Refusal for corresponding Japanese Application No. 2013-503865 dated Feb. 13, 2014 and English translation thereof.

Notice of Preliminary Rejection for corresponding Korean Application No. 10-2012-7029190 dated Jun. 2, 2014 and English translation thereof.

* cited by examiner

METHOD OF MACHINE-TO-MACHINE COMMUNICATION

BACKGROUND

Field of the Invention

The present invention relates to machine-to-machine communication, and in particular to machine-to-machine communication via a wireless network.

Description of the Related Art

Machine-to-Machine (M2M) communications in a network are characterized often by being short, regular, infrequent communications of small amounts of data, though other M2M applications do not necessarily fit this profile. An example of an application fitting this profile is automatic gas meter reporting. An example of an application not fitting this profile is a remote video surveillance camera streaming data back to a central site.

In the Meter-Reporting case, a very small amount of data is to be provided to the consumer of the data, e.g., the gas company that prepares the billing for gas usage. This data only needs to be transmitted at regular intervals of perhaps 24 hours. To use a network, for example a wireless network, to transmit this data, a registration with the network is currently required. The registration needs to be kept current or updated to allow the meter-reporting device to be accepted by the network, and to have its signaling transmitted to the data consumer. Without changes to current networks, particularly wireless networks, maintaining registration may require a high amount of overhead compared to the actual quantity of data transferred.

There is also the problem of signaling and addressing. If each meter-reporting unit has its own identity that is used by the network to address it, and if that address is part of the existing address space of other units using that network, e.g., mobile phones, then all of those addresses/identities can be quickly consumed as the number of M2M devices proliferates.

SUMMARY

The present invention relates to a method of machine-to-machine communication.

In one embodiment, the method includes encrypting, at a device, data with a first key; and forming a message that includes a device identifier and the encrypted data. The device identifier identifies the device. A signaling message is formed that includes a class identifier, the message and an action code. The class identifier identifies a group of devices to which the device belongs. The action code indicates the type of data, and may be part of the message. The signaling message is sent to a network, for example, a wireless network.

In another embodiment, the method includes determining if a received signaling message includes a class identifier identifying the signaling message as a machine-to machine communication; and routing at least a message portion of the signaling message to a particular application server based on the class identifier without setting up a communication session if the determining step determines the received signaling message includes the class identifier. The message portion includes a device identifier and data, and the device identifier identifies a device within a group of devices identified by the class identifier.

In a further embodiment, the method includes sending, by a wireless network, a control signaling message. The control signaling message includes a class identifier. The class identifier identifies a group of devices to which one or more devices belong, and the control signaling message indicates at least one operating parameter for the group of devices. The group of devices recognize a control signaling message intended for the group based on the class identifier. In response, the devices operate and/or change operation according to the operating parameter.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Unless specifically stated otherwise, or as is apparent from the discussion, terms such as "processing," "computing," "calculating," "determining," "displaying," or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of tangible recording (or storage) medium or implemented over some type of transmission medium. The tangible storage medium may be magnetic (e.g., a floppy disk or a hard drive), optical (e.g., a compact disk read only memory, or "CD ROM"), solid state, etc; may be read only or random access; and may be volatile or non-volatile. Similarly, the transmission medium may be twisted wire pairs, coaxial cable, optical fiber, over-the-air or some other suitable transmission medium known to the art. The example embodiments are not limited by these aspects of any given implementation.

As used herein, the term "mobile terminal" may be considered synonymous to, and may hereafter be occasionally referred to, as a mobile, mobile unit, mobile station, mobile user, subscriber, user, remote station, access terminal, receiver, user equipment, etc., and may describe a remote user of wireless resources in a wireless communication network.

Figure 1:
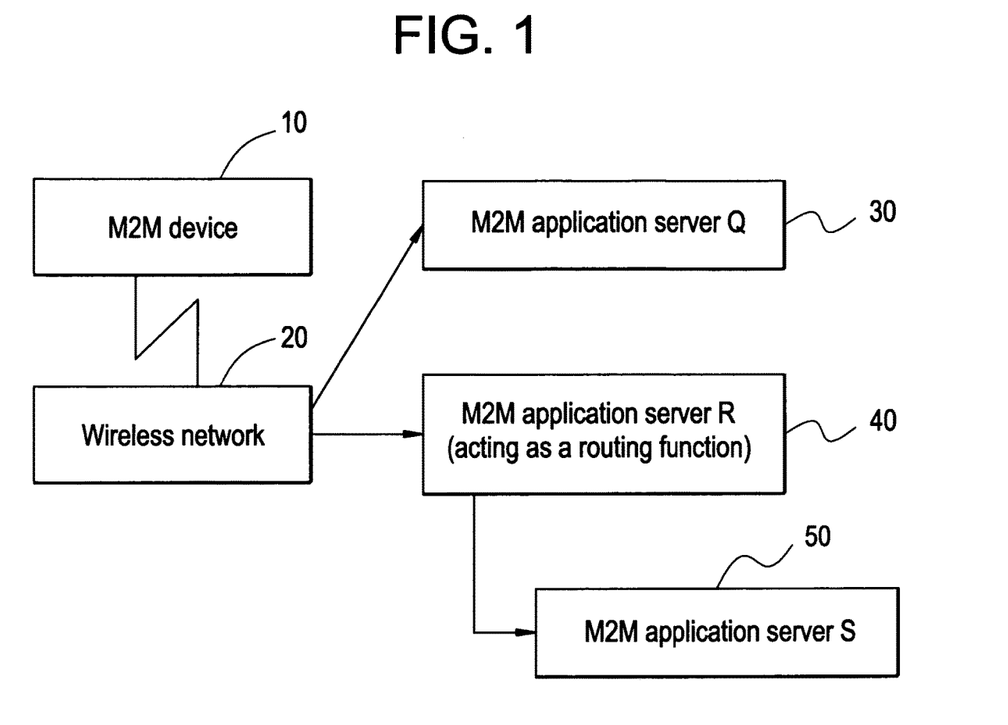
FIG. 1 illustrates an example architecture of an M2M system.

The present invention is directed to machine-to-machine (M2M) communication, also called machine-type communication. FIG. 1 illustrates an example architecture of an M2M system. As shown, an M2M device 10, such as a gas meter, includes a mobile terminal capability, and as such, measurements and/or reports of the M2M device may be sent to one of a plurality of M2M application servers 30, 40, and 50 via a wireless network 20. While FIG. 1 shows a single M2M device 10, it will be appreciated that numerous M2M devices may exist. Also, while FIG. 1 only shows a few M2M application servers, it will be appreciated that numerous M2M application servers may exist. An M2M application server handles automatically processing of the measurements and/or reports from the M2M device to, for example, bill customers associated with the M2M devices. The wireless network 20 and the M2M device 10 may operate according to any well-known wireless protocols.

According to one embodiment, each M2M device has a generic identity that allows a wireless network to address large collections or groups of M2M devices simultaneously, e.g., a common Mobile Equipment Identifier (MEID), referred to as the M2M class identifier. For example, gas meters may have the same M2M class identifier, or gas meters of a certain company may have the same M2M class identifier. As will be described in greater detail below, the M2M class identifier identifies M2M devices to the wireless network 20, and permits management of the group of M2M devices associated with the M2M class identifier by the wireless network 20.

Figure 2:
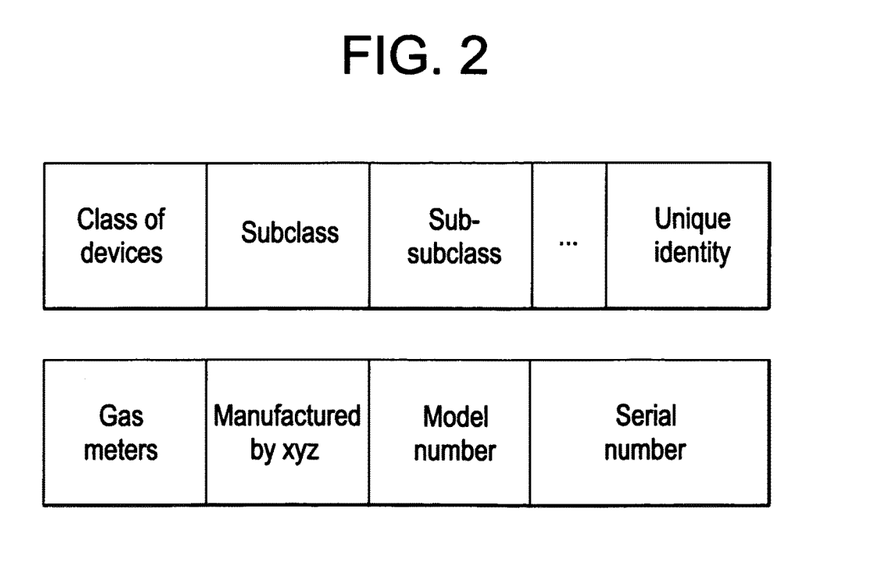
FIG. 2 illustrates an embodiment of an M2M class identifier structure.

Each M2M device also has an identity that is used at the application layer, and at an optional M2M routing sublayer. This is referred to as the M2M identity or identifier and uniquely identifies the M2M device within the group of M2M devices identified by the class identifier. FIG. 2 illustrates an M2M identity structure. As shown, the first section identifies the class of M2M devices (e.g., gas meters), the second section identifies a subclass of the M2M devices (e.g., manufacturer of the gas meters, gas company associated with the gas meters, etc.), additional sections may be provided for additional subclasses (e.g., model number), and a last section includes a unique identity of the M2M device (e.g., a serial number). As will be appreciated, each section may represent a number of bits forming the M2M identity. As will be further appreciated, one or more sections of the M2M identity may be composed of a particular value, e.g., all bits set to zero, that is interpreted as a "wildcard" value that will be interpreted as a "match" by any receiving entity that understands the format of the M2M identity. This allows, for example, an M2M communication to be received and acted on by a subset of M2M devices. In one example embodiment, a wireless network 20 may send an M2M communication using the M2M class identity to select, e.g., all gas meters, and an M2M identity that uses a "wildcard" value in the subsection used for the serial number to cause all gas meters made by a particular manufacturer and having the same model number to act on the M2M communication. The M2M identifier is known both to the wireless access network 20, and to the application server 30, 40 and 50 associated with the M2M device. The M2M identity may be provisioned into each M2M device at manufacture/deployment. It is (logically) separate from the M2M class identifier. The M2M identity is included in signaling to allow identification of a specific M2M device, and to support point-to-point communication with a single device, when required.

The wireless network and the M2M devices having a common M2M class identifier share a first secret key that allows the wireless network and the devices to communicate securely, e.g., to provide integrity protection and/or encryption of the content transmitted between the M2M device 10 and the wireless access network 20. Each M2M device has a separate second secret key that is used to provide secure communication at the M2M application level, e.g., a key that will allow encryption of a gas meter reading.

Figure 3:
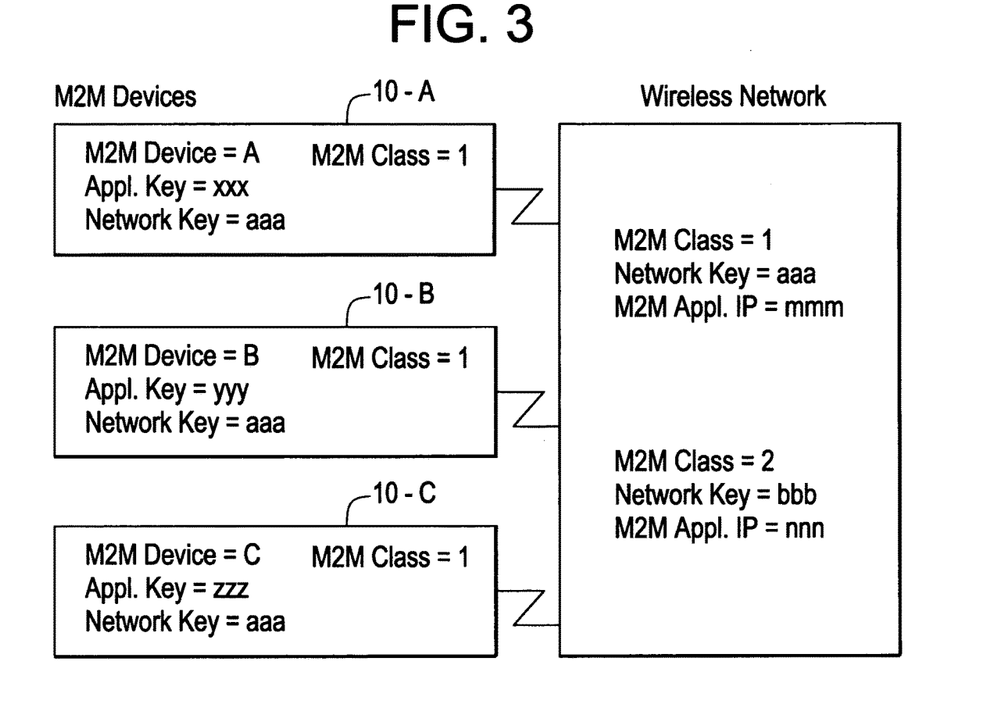
FIG. 3 illustrates the keys and identifiers employed by M2M devices and the wireless network.

FIG. 3 illustrates the keys and identifiers employed by M2M devices and the wireless network. In particular, FIG. 3 illustrates three M2M devices 10-A, 10-B, 10-C belonging to the same class. Namely, these M2M devices have the same M2M class identifier. For example, the M2M devices may be gas meters associated with the same gas company. As further shown, each M2M device 10-A, 10-B, 10-C has the same network secret key 'aaa', but different application keys 'xxx', 'yyy', and 'zzz' respectively. The wireless network 20 also has knowledge of (e.g., stores in a database) the M2M class identifier and the network secret key. However, the wireless network 20 does not have knowledge of the application keys in this embodiment. Additionally, the wireless network 20 has knowledge of the M2M class identifiers and network keys for other groups of M2M devices. FIG. 3 shows that the wireless network 20 has knowledge of M2M class identifier=2 and associated network key='bbb.' FIG. 3 further shows that an IP address is associated with each class identifier. This will be described in greater detail below.

Figure 5:
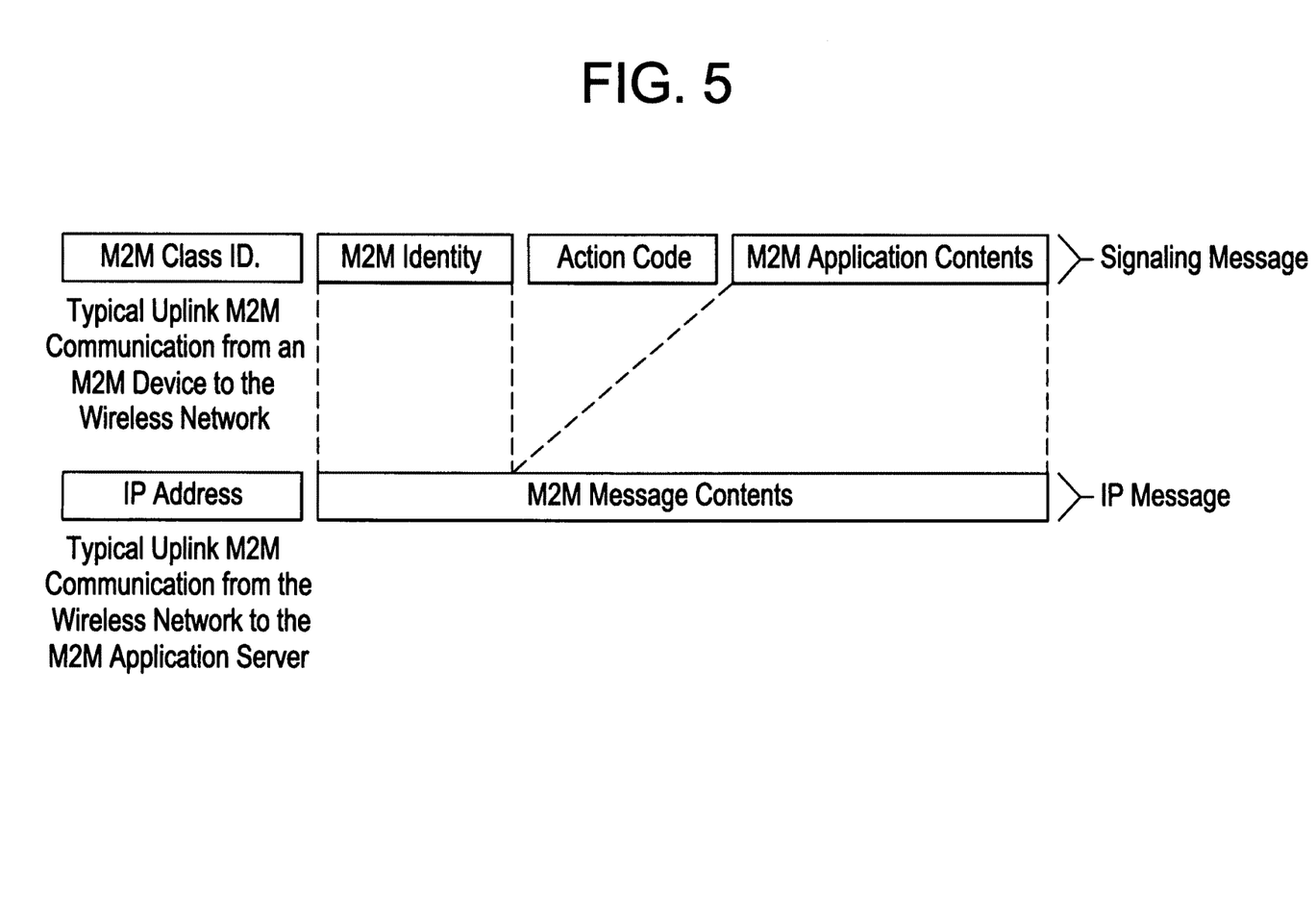
FIG. 5 illustrates example formats of a signaling message and an IP message.
Figure 6:
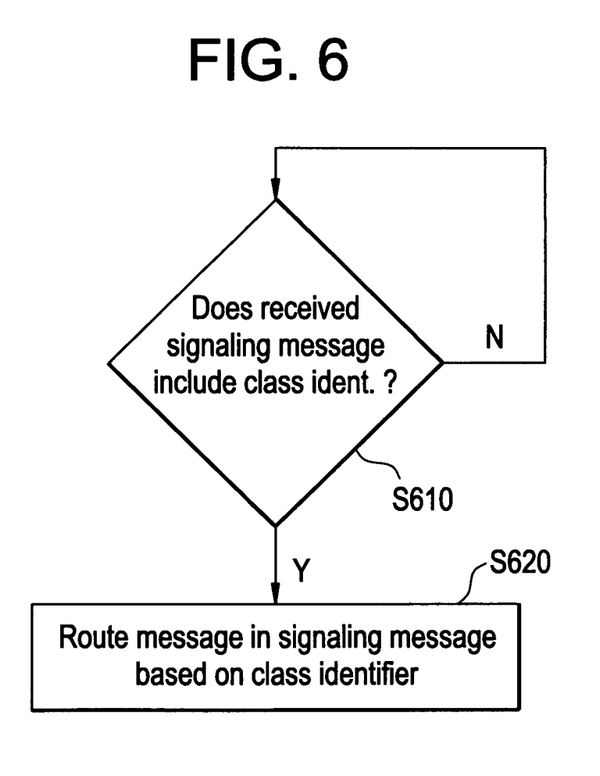
FIG. 6 illustrates an example operation at the wireless network.

Operation of the present invention will now be described in detail with respect to FIGS. 4-6.

Figure 4:
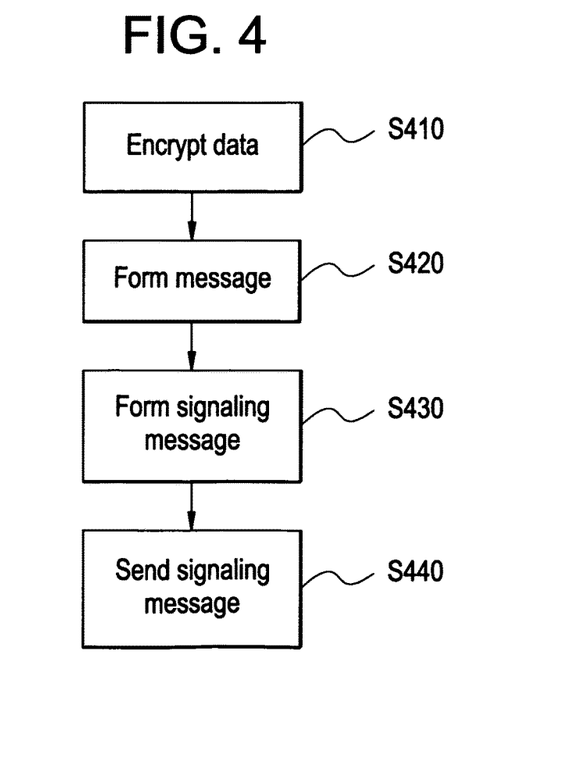
FIG. 4 illustrates an example operation at an M2M device.

FIG. 4 illustrates an example operation at an M2M device. As discussed previously, an M2M device, such as M2M device 10, typically generates a measurement, report, and/or etc. collectively referred to as data. This may occur on a periodic basis, in response to an event trigger, in response to a request, etc. The M2M device 10 encrypts the generated data in step S410 using the application layer key. The M2M device 10 then forms a message using the encrypted data in step S420. An example format of the message includes the M2M identity and the encrypted data. The encrypted data may also be referred to as M2M application contents. The message may also, optionally, include an action code. The action code indicates the type of the encrypted data. The action code will be described in more detail below.

In step S430, the M2M device 10 forms a signaling message. The signaling message may have the format as shown in FIG. 5. As shown, the signaling message includes the message formed in step S420 plus the M2M class identifier of the M2M device 10. If the message of step S420 did not include the action code, the action code may be added as part of the formation of the signaling message. Namely, the action code is optionally part of the message or signaling message; or, may not be included at all. As mentioned above, the action code indicates the type of data in the M2M application contents. For example, the action code may indicate data for transfer, operating parameters of the device, etc. The operating parameters may be a sleep period, access class, access parameters, request for provisioning, etc. An access class is a set of M2M devices that have a particular value identifying them as part of that class. The network may have, for example, the ability to bar communication for entire access classes of mobiles to handle congestion issues. The access class and access parameters are typically handled directly in the wireless network 20. As will be described in greater detail below, the use of the action code permits control of the wireless communication between the M2M device 10 and the wireless network 20.

In step S440, the M2M device 10 sends the signaling message to the wireless network 20. Typically, the M2M device 10 will use a shared communication channel, shared by other M2M devices, for sending the signaling message. Also, the signaling message may be sent encrypted using the network key as described above with respect to FIG. 3.

Next, operation of the wireless network 20 will be described with respect to FIG. 6. As shown, the wireless network 20 determines whether a received signaling message includes an M2M class identifier or not in step S610. As will be recalled, the wireless network stores M2M class identifiers. If the M2M class identifier in the signaling message matches a stored M2M class identifier, then the wireless network 20 determines that the received signaling message includes an M2M class identifier. This indicates that the received signaling message is a machine-to machine communication. Therefore, in step S620, the wireless network does not establish a communication session with the M2M device 20 according to conventional wireless communication protocols, and instead, the wireless network 20 routes a message portion of the received signaling message to an application server, wherein that message portion may or may not also include an action code. Namely, the M2M device 10 is not attached and does not become attached to the wireless network 20.

As will be recalled from the discussion of FIG. 3, the wireless network 20 associates an IP address with each M2M class identifier. As shown in FIG. 5, this IP address, and optionally a port number, is appended to an M2M message portion of the signaling message. The M2M message portion includes the M2M identity or identifier and the encrypted data. The M2M message portion may also be referred to as the M2M message contents. Creation of this IP message may also be considered encapsulation of the message portion in an IP packet.

Referring back to FIG. 1, the application server to which the routed IP message is sent may or may not be the destination application server. For example, in FIG. 1 the M2M application server R 40 may receive an IP message and determine from the IP address and/or the M2M identifier that the IP message or M2M message contents should be routed to the M2M application server S 50. For example, the M2M application server R 40 may be programmed to append a different IP address to the M2M message contents based on the M2M identifier. The receiving M2M application server S 50 then processes the M2M message contents. In particular, the particular M2M device is recognized from the M2M identity, and the encrypted data is decrypted using the application layer key stored at the application server. The data may, for example, be a gas meter reading and the application server may be that of the gas company. Based on the gas meter reading the application server may automatically generate billing for the customer associated with the gas meter (i.e., the M2M device).

As discussed above, when a wireless network receives a communication from an M2M device, it notes only the M2M class identifier, and notes that this identifier has a value assigned to a class of M2M devices. The wireless network may examine the action code to determine how to handle the M2M communication it has received. For example, the wireless network may note an action code that it is responsible for handling. This will be described further below. The wireless network will also note action codes that must be forwarded to other entities for processing. For example, the wireless network may routes the content of such messages to an M2M application server that can either process the content of the communication directly, or use the M2M class identifier to route the communication to a specific application server for processing. In this way, the burden on the wireless network is minimized by simply routing such communications automatically to a known location, e.g., using a provisioned IP address and, optionally, a port number. Further, the M2M application server can perform other routing based on a variety of criteria (IP address, M2M class, subclass or subclasses, etc.). The application server that ultimately processes the M2M communication will use the M2M identity to find the application layer secret key for that specific device, and thus be able to decrypt the content.

The use of these capabilities minimizes the work load on the wireless network that is presented by the introduction of M2M devices. The use of a provisioned, or alternatively, a pre-established M2M class identifier allows for reduced signaling overhead within the wireless network.

Further operation of the present invention will now be described with reference to FIGS. 7-8. A signaling protocol may exist between the wireless network and the M2M device that allows the wireless network control of the M2M devices to adjust the period at which the M2M device communicates, the time of the communication, etc.

Figure 7:
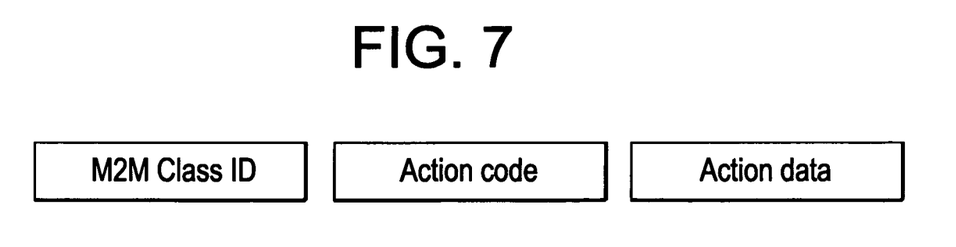
FIG. 7 illustrates an example format of a control signaling message.

Here, the wireless network generates a control signaling message such as shown in FIG. 7. As shown, the control signaling message includes the M2M class identifier of the group of M2M devices that the wireless network wants to control. The control signal message further includes an M2M identifier, an action code and action data. The M2M identifier may indicate a single M2M device, or may use, for example, a "wildcard" feature to indicate a subset of the devices that belong to the same M2M class, i.e., have the same M2M class identifier. As discussed above, the action code indicates the type of data, referred to as action data in FIG. 7 for the sake of clarity only. For example, the action code may indicate a sleep period, access parameters, etc.

Figure 8:
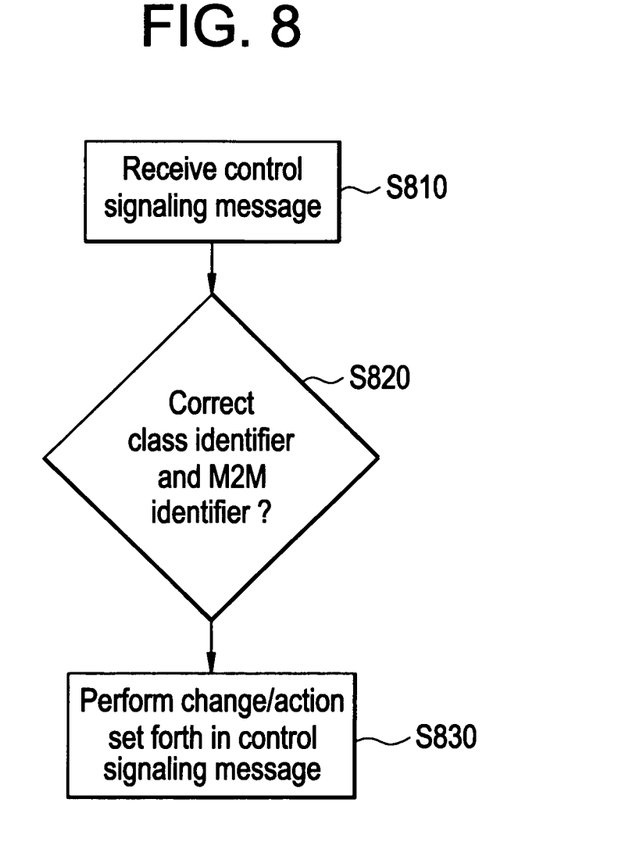
FIG. 8 illustrates another example operation at the wireless network.

FIG. 8 illustrates the operation of an M2M device with respect to a control signaling message. As shown, in step S810 the M2M device receives a control signaling message. This message may be received over a shared communication channel. The M2M device then determines in step S820 if the M2M class identifier in the control signaling message matches the M2M class identifier for the M2M device. If not, processing returns to step S810. If a match exists, the M2M device determines if the M2M identifier matches the M2M identifier for the M2M device in step S825, including a match based on a section or subsection that contains a "wildcard" value. If no match exists, processing returns to step S810. If this second match exists, then in step S830 the M2M device performs the action or changes indicated by the action code using the action data.

In this manner, the wireless network has the ability to control the M2M devices in various ways, including the frequency and timing of communications. For example, the M2M device may remain in a sleep mode for a sleep period, and wake up periodically to generate and send signaling messages as described above (e.g., include a measure gas reading as the data). The time of transmission may be chosen based on what network predicts to be a congestion free period. However, in spite of that, congestion may occur. Consequently, the M2M devices of a given class can all be contacted in a single control signaling message at a time when the devices are listening. The single control signaling message can adjust the timing of the next communication from the M2M devices in that class. The control signaling message may be encrypted/integrity protected by use of the secret key known to the network and to all M2M devices of that class. In addition, since the devices would typically be communicating over a common channel (suitable for short burst communications), the network can advise a secondary randomization configuration parameter over and above what is currently used in the network so as to reduce the contention with the regular users whose data communications may be more sensitive to time delays.

For example, each gas meter reporting M2M device is assumed to be provisioned to wake up at some large interval, perhaps each 24 hours, at a given time to report the gas meter measurements, perhaps 3:00 am. Each gas meter reporting M2M device could also be provisioned to wake up at a 24 hour interval, but the "wake up time" could be randomized to spread the signaling load on the wireless network. As a further example, at some point, the wireless network owner is contacted by the gas business owner with a request to have gas measurement reporting occur at 12 hour intervals. The wireless network is commanded by operations personnel to adjust the reporting period from 24 to 12 hours. The wireless network creates a control signaling message addressed to the M2M class identifier, containing a command to adjust to a 12 hour reporting period, and encrypted using the secret key shared by the wireless network and the M2M devices having that M2M class identifier. Such a control signaling message could be further refined by including an M2M identifier with the message that specifies a particular subset of gas meters using "wildcard" values in an appropriate subsection of the M2M identifier.

It is anticipated that over-the-air provisioning of such M2M devices can be supported, even to the point of allowing the consumer to self-install the device followed by network-controlled configuration. For example, the M2M device may send a signaling message where the action code requests provisioning. In this case, the wireless network does not necessarily route a message to an application server, but instead responds to the request via a control signaling message. Through a handshake process of signaling messages and control signal messages, an M2M device may be provisioned, controlled, etc. It is contemplated that the wireless network may signal the appropriate application server once an M2M device has been provisioned and/or controlled in a particular manner. Also, the wireless network may handle many M2M devices without a requirement to maintain unique configuration data for each device. Instead configuration data may be maintained at the wireless network on an M2M class identifier basis, and those access parameters can be signaled to an M2M device.

The example of gas meters for M2M devices has been used above. It will be recognized that gas meters are generally stationary M2M devices. However, the M2M device or devices may be mobile. The wireless network is able to treat mobile M2M devices as stationary and not track their mobility.

The combination of capabilities discussed above addresses several key constraint areas associated with large scale M2M deployments, which could provide an attractive revenue source for wireless service providers. Namely, combining M2M devices into class identifiers allows for communications among a large number of devices within a geographical area while minimizing signaling overhead. Note that the reduction in signaling overhead not only improves the wireless network efficiency, but reduces the overall power consumption of the end device. It allows the network operator/service provider to leverage their investments in the evolving M2M industry. Without this invention, the networks will not be able to sustain the large quantities of signaling required by existing protocols. The ability to reduce overall power consumption (via reduced signaling overhead) reduces the design constraints on the M2M device (e.g., need for external power source) and/or reduces the operational cost of the end customer (e.g., cost to the power company of battery replacements).

The ability to provide downlink control using the above-described mechanism allows for the solution to be easily adaptable without visiting the M2M device. Further, the use of M2M class identifiers allows for single commands to address a large number of M2M devices in a single message. With the embedded M2M identity, single M2M devices can also be addressed. In either case, the wireless network need not be aware of the distinction between broadcast and single endpoint communications. (The distinction is included entirely within the application payload.)

The invention being thus described, it will be obvious that the same may be varied in many ways. Such variations are not to be regarded as a departure from the invention, and all such modifications are intended to be included within the scope of the invention.

We claim:

1. A method of machine-to-machine communication, comprising:
   receiving, by a wireless network, a signaling message from a device, the received signaling message including at least,
      a class identifier identifying a group of devices to which the device belongs, the class identifier enabling the wireless network to service the group of devices simultaneously,
      a message portion including at least a device identifier and data, the device identifier uniquely identifying the device in the group of devices identified by the class identifier, and
      an action code indicating a type of the data;
   identifying, by the wireless network, the received signaling message as a machine-to-machine communication based on the class identifier being included in the received signaling message;
   determining, by the wireless network, handling information for the identified machine-to-machine communication based on the class identifier and the action code, the handling information indicating at least a network location associated with the class identifier to which at least the message portion of the received signaling message should be forwarded for processing; and
   routing, at the wireless network, at least the message portion of the received signaling message to a particular application server associated with the network location based on the class identifier and the action code without setting up a communication session with the device.

2. The method of claim 1, wherein
   the class identifier identifies the group of devices to which the device belongs and identifies at least one sub-group of devices in the group to which the device belongs; and
   the routing routes the message portion based on the group and the sub-group.

3. The method of claim 2, wherein the class identifier further uniquely identifies the device within the group.

4. The method of claim 1, further comprising:
   wirelessly receiving the signaling message.

5. The method of claim 1, wherein the routing encapsulates the message portion in an IP packet addressed to the network location associated with the particular application server.

6. The method of claim 1, wherein
   the received signaling message is encrypted based on a first secret encryption key known in common to the group of devices identified by the class identifier and the wireless network, the wireless network using the first secret encryption key to decrypt the encrypted signaling message prior to the routing, and
   at least the data included in the message portion of the decrypted signaling message is encrypted based on a second secret encryption key known only to the device uniquely identified by the device identifier and the particular application server, the device identifier identifying the second secret encryption key for the particular application server.

7. The method of claim 1, wherein the action code further indicates one or more operating parameters of the device, the operating parameters including one or more of a sleep period, an access class, access parameters, and a request for provisioning.

* * * * *